April 22, 1941.    E. E. WEMP    2,239,161
CLUTCH
Filed Feb. 11, 1932    3 Sheets-Sheet 1

INVENTOR.
ERNEST E. WEMP.
BY
Barnes, Kisselle & Laughlin
ATTORNEYS.

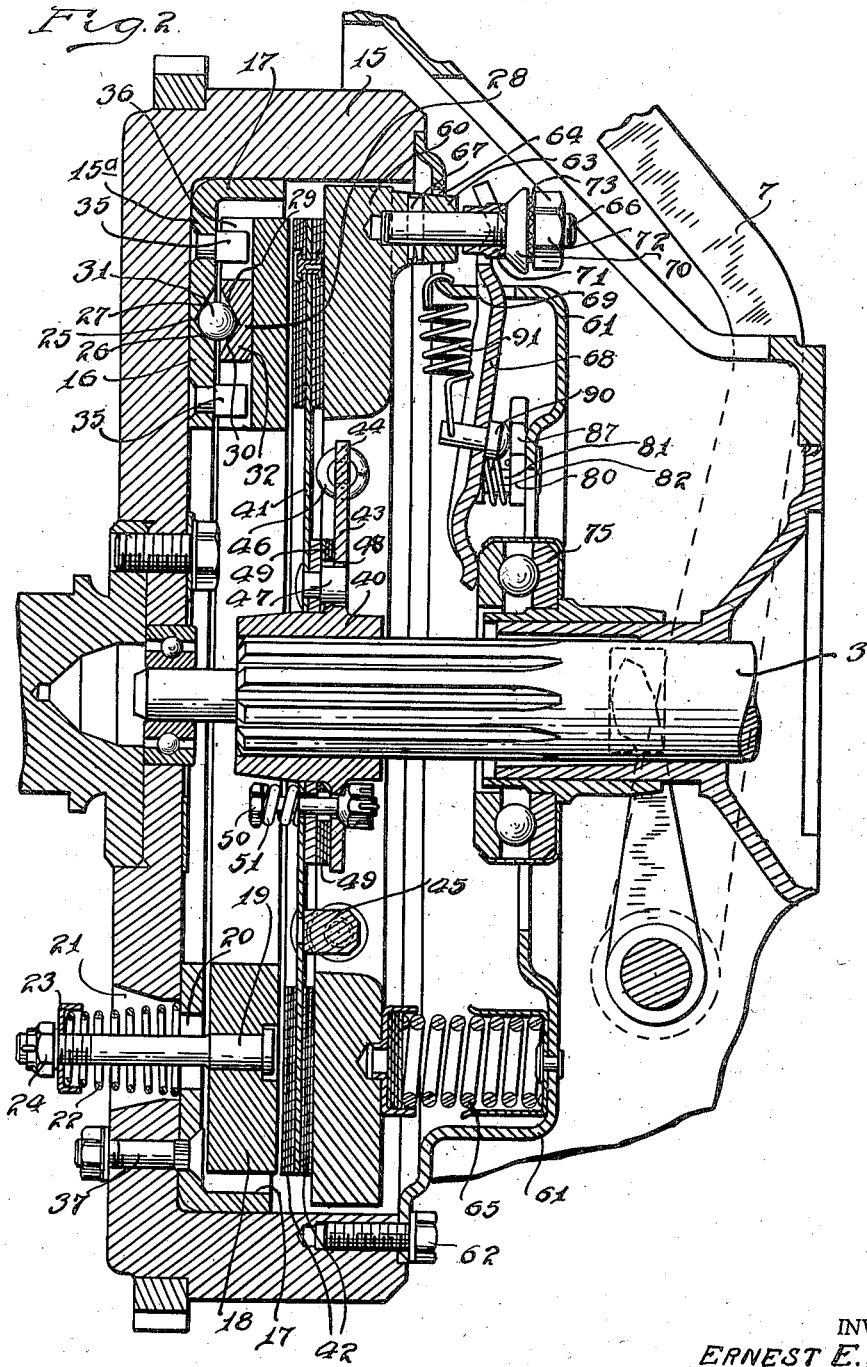

April 22, 1941. E. E. WEMP 2,239,161
CLUTCH
Filed Feb. 11, 1932  3 Sheets-Sheet 3
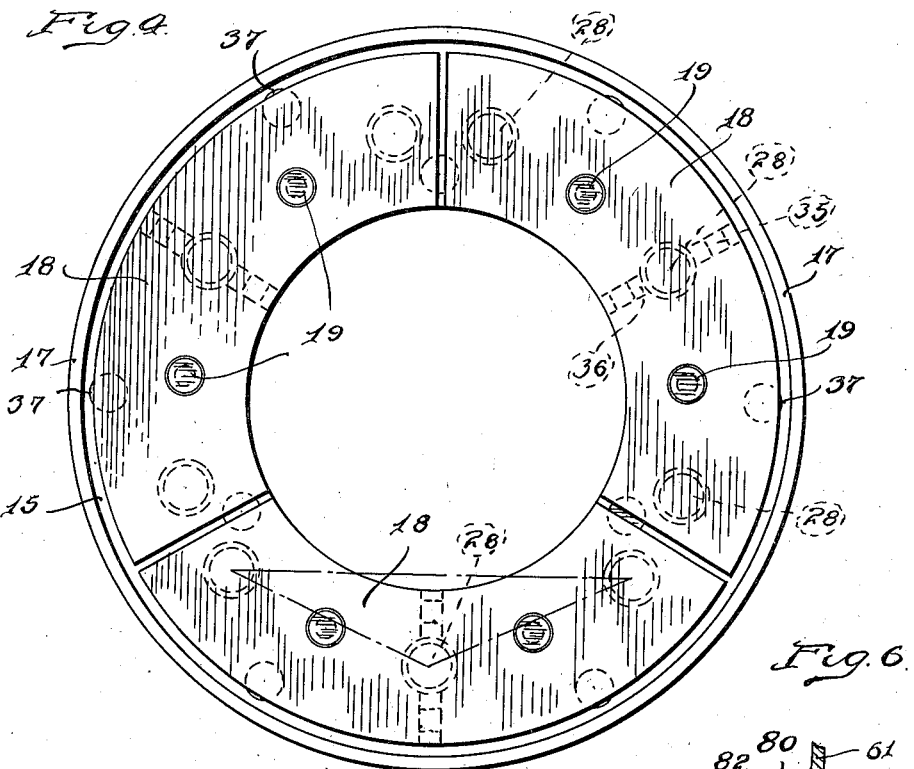
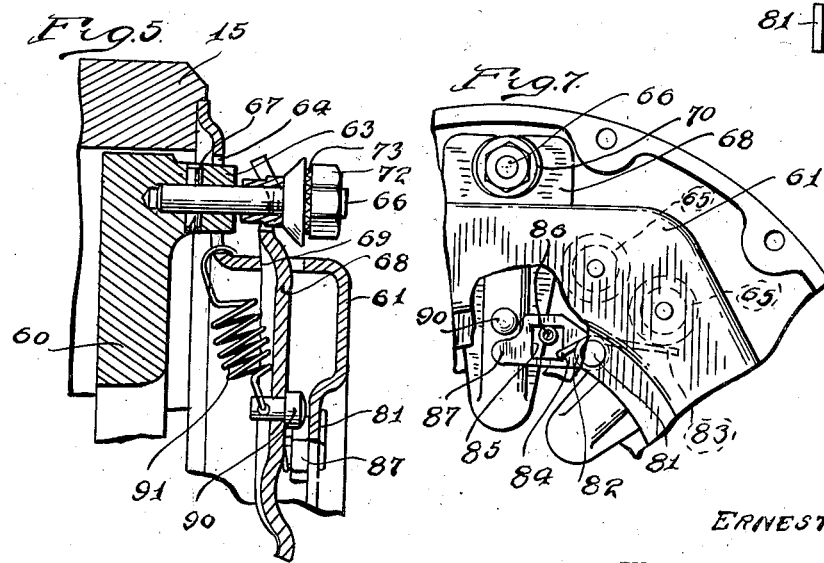
INVENTOR.
ERNEST E. WEMP.
BY
Barnes, Kisselle & Laughlin
ATTORNEYS.

Patented Apr. 22, 1941

2,239,161

UNITED STATES PATENT OFFICE 2,239,161

CLUTCH

Ernest E. Wemp, Detroit, Mich.

Application February 11, 1932, Serial No. 592,301

29 Claims. (Cl. 192—105)

This invention relates to a clutch structure such as may be employed in the transmission of power in an automotive vehicle. The invention aims to provide a clutch which is capable of becoming engaged or disengaged without requiring physical effort on the part of the operator and is, in a sense, automatically acting. It is also the aim of the invention to provide a clutch structure in which manual operations of the clutch may be obtained under certain conditions at the election of the operator. The clutch structure enters into a combination with other power transmitting parts, as will later be brought out, and while the invention is particularly concerned with automotive vehicles, it may be employed for transmitting power in other places. The invention will be described herein as it is related to an automotive vehicle.

More particularly, the invention contemplates a clutch in which the automatic engagement and disengagement may be obtained by centrifugal force. In other words, the clutch may become engaged as the engine of the vehicle is accelerated and it may become disengaged when the engine is at idling speed or completely stopped and at rest. The invention provides for a control of the clutch by the operator any time the engine is stopped irrespective of whether or not the engine has died from some cause or whether it was purposely stopped by the operator. The clutch structure may and preferably is employed with a so-called free wheeling unit in an automotive vehicle which, as is known to those versed in the art, comprises an overrunning or one-way drive connection between the traction wheels of the vehicle and a power transmitting part. When such a free wheeling unit is employed, the engine may be decelerated to an idling speed while the vehicle may continue at a relatively high rate of speed, and it is at this time that the engine may stop completely or die. A number of things may cause this complete stopping of the engine, as for example, when the same is cold or over heated. A clutch constructed in accordance with this invention may be manually controlled at such a time. There are other objects which will appear as the detailed description progresses, and likewise there is novelty in several structural details which will also become apparent as the description progresses.

In the accompanying drawings:

Fig. 2 is a sectional view taken through the clutch structure.

Fig. 4 is a rear view of the centrifugally controlled elements of the clutch.

Fig. 5 is a view illustrating in more detail some of the clutch control mechanism.

Fig. 6 is a sectional view showing the mounting for a controlling element.

Fig. 7 is a detail view with parts cut away illustrating the mounting for a governing element.

Figure 1:
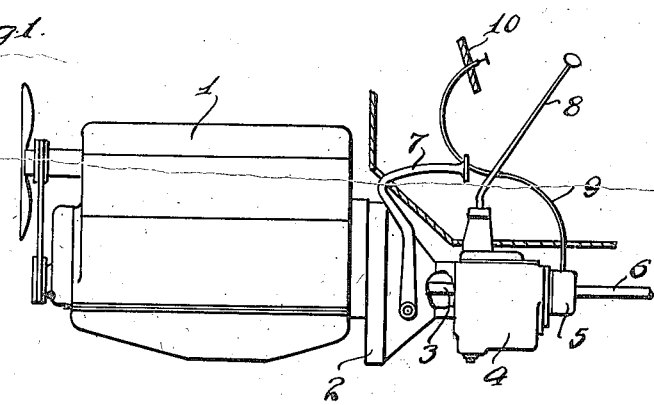
Fig. 1 is a more or less diagrammatic view in illustration of an engine, clutch housing, transmission and free wheeling unit of an automotive vehicle.

In Fig. 1 there is shown an engine 1 associated with which is a clutch housing 2, a driven shaft 3, a transmission housing 4 for containing selective gears or the like, a free wheeling unit which may be in a housing 5, from which extends shaft 6 which makes connection with the traction wheels (not shown). The usual clutch pedal lever is shown at 7, gear shift lever 8, while at 9 is a control for the free wheeling unit which may be in the form of a Bowden wire extending through instrument panel 10. Further detailed description of these parts are unnecessary as they are well known to those versed in the art; suffice to say that the free wheeling unit may employ any usual or known structure for establishing a one-way drive between driven shaft 3 and transmission so as to permit the shaft 6 to overrun the same. Also, as known to those versed in the art, the free wheeling unit may be controlled through the means of control element 9 so that a positive drive may be established between the shaft 6 and transmission to the end that these two are tied together so that either may drive the other irrespective of the direction of force, thus to keep the vehicle from overrunning the engine.

The clutch structure may be associated with the engine flywheel 15, as shown in Fig. 2. This clutch structure has certain automatically acting parts, as for example, centrifugally controlled elements, and these elements together with the other associated parts, are preferably constituted in a unit assembly independent of other clutch parts such as the parts designed for manual operation. The flywheel may be recessed as shown. The centrifugal elements together with other immediately associated parts may be mounted as a unit within the recess of the flywheel. Such unit assembly may comprise a back plate or carrier plate 15ª which may be circular to fit within the recess in flywheel 15 and which may be angular in cross section so that one leg, as at 16, abuts against the radially extending portion of the flywheel while the other leg 17 fits within the inside walls of the recess. This plate may carry centrifugal controlled elements in any suitable numbers; as shown in Fig. 4 there are three of such elements made up in segment form and shown at 18. These segmental elements may be associated with the backing plate through the means of studs 19 advantageously located as shown in Fig. 4, wherein there are two studs for each segment. These studs extend through apertures 20 in the backing plate which are preferably enlarged or elongated as shown in Fig. 2 to permit of radial in-and-out movement thereof relative to the backing plate. The flywheel likewise may be provided with apertures 21 through which the studs 19 extend. A spring such as a coil spring 22 may surround each stud and rest upon the backing plate at one end, as shown, while the other end may be confined by a retaining washer 23 and nut 24. As shown, the spring 22 may be somewhat conical in shape so that the retaining washer 23 and adjacent end of the spring may be somewhat smaller in diameter than the aperture 21 to permit of ease in assembly as will later appear.

The backing plate and each segment may each be provided with a formation so as to provide surfaces disposed at an angle to the plane of rotation. Such formation may comprise depressions with angular walls; as shown in Fig. 2, a depression 25 in the backing plate has angular walls 26 and 27 and a cooperating depression 28 in the segment has angular walls 29 and 30. These cooperating depressions form a pocket in which there is a roller element 31. The depressions may and preferably are circular in form as illustrated in Fig. 4, while the roller element associated therewith is preferably in the form of a ball. The segment may have block like inserts or the like 32 secured thereto in any suitable manner, which inserts provide the depressions and these inserts may be of hardened metal. As shown in Fig. 4, each segment may be provided with three depressions 28, and the back plate may likewise be provided with three cooperating depressions for each segment. These are so arranged as to preferably give the segment stability in all planes, as regards the back packing plate. To illustrate this, dot and dash lines are shown in Fig. 4 connecting the center points of the three depressions in a segment, and it will be noted that this arrangement provides for a three-point contact between each segment and the backing plate so as to prevent rocking of the segment in any plane with respect to the backing plate. The two end-most depressions with their associated balls stabilize the segment in the direction of effort, or in other words, substantially in a tangential direction so that a segment cannot rock relative to the backing plate on a radially extending fulcrum. This, it may be pointed out, is the critical plane in which it is most desired to stabilize the segment. The two end contacts, however, in conjunction with the center recess and associated balls, give each segment a firm three-point contact with the backing plate thus stabilizing the segment from rocking on a fulcrum, which may be a chord struck through the segment. This stabilizing of the segments and the reasons therefor will be more readily appreciated when the operation of a clutch is described.

The plate 15ᵃ and the several segments are associated with each other to rotate in unison. In this regard the plate 15ᵃ may serve as a driver element for the segments. For this purpose the driving stud 35 may be carried by the backing plate and project into a radial groove 36 in each segment. The backing plate may be secured to the flywheel in driving relation therewith as by means of bolts 37 as shown in Fig. 2.

The backing plate and segments and other associated parts may be manufactured and assembled as a centrifugal unit so that it may easily be assembled as a unit to an appropriately designed flywheel. Thus, a backing plate may be provided with the requisite number of studs 37, and then the segments with the interposed balls may be mounted upon the backing plate, the assembly being held together by the studs 19, springs 22 and associated parts. This assembly as a unit may now be bodily inserted in the flywheel recess and all that remains to be done is the tightening of the nuts on the ends of the bolts 37.

Before describing other parts of the clutch it would seem to be advantageous to set forth the function of the parts thus far described. The centrifugal segmental elements operate in a manner similar to that set forth in my copending application #578,988, filed December 4, 1931, now Patent No. 1,975,185 dated Oct. 2, 1934. When the parts are at rest, the springs 22 urge the segments toward the backing plate to the end that the balls 31 seat in the bottom portions of the cooperating recesses in the position shown in Fig. 2. When the parts rotate the segmental elements under the action of centrifugal force shift radially outwardly; when this occurs, viewing the upper portion of Fig. 2, the angular surface 30 approaches the angular surface 27 with a compressing action on the ball. Upon continued outward movement these cooperating surfaces with the interposed ball effect movement of the segments in an axial direction away from the backing plate. It is due to this axial movement of the segments that a clutch engagement is effected. The radial movement of the segments relative to the backing plate is readily permitted by the driving studs 35 sliding in the slots 36 and by the studs 19 shifting in the enlarged apertures 20. Due to the fact that circular depressions are used in conjunction with a cooperating element such as a ball, the axial shift of a segment is uniform at the central portion thereof and at the ends, because the angularity from the bottom of the depression to the rim thereof is the same in all directions. Ultimately the segments may shift radially outward far enough to stop against the leg 17 of the backing plate, and when this point is reached there may be no further movement radially outward of the segments.

The driven shaft 3 may be piloted at the center of the flywheel, as shown, and have thereon advantageously by means of a split connection, a hub 40. A driven disk 41 may have frictional facing material 42, and this driven disk is connected to the hub. The connection between the disk and hub may be of any desired form; as for example, it may include vibration dampening elements. As shown herein the hub has a flange 43 with projections 44, and situated between the projections 44 and studs 45 on the driven disk may be coil springs 46 which afford a flexible connection between the disk and hub. A loose positive connection may be provided by studs 47 situated in the large apertures in the flange 48, while friction material 49 may be disposed between the disk and flange to dampen the relative movement permitted by the springs. The disk and flange may be packed together against the interposed friction material 49 by bolts 50 passing through the same and provided each with a spring 51. This interconnection between the disk and flange need not be the subject matter of further detailed disclosure as the same is exemplified in one or more patents previously granted to me. It is important to note, however, that due to the fact that the free wheeling element, as at 5 (Fig. 1) is located to the rear of the transmission, the interconnection between the disk and hub may be utilized for the vibration dampening connection.

A pressure plate is shown at 60, while a clutch cover plate is at 61, secured to the flywheel by cap screws 62. This pressure plate may have lugs 63 passing through apertures 64 in the cover plate for establishing a drive connection for the pressure plate. The pressure plate may be acted upon by clutch packing springs 65 backed up by the cover plate.

Means are provided for retracting the pressure plate against the action of the spring 65, and such means may take the form of studs 66 which may be secured to the lugs 63 as by means of pins 67 and clutch-releasing levers 68 which may pass through the cover plate, as shown in Fig. 2, and fulcrum at the point 69. The levers 68 may be forked at their outer end for the passage therethrough of the studs 66; on each stud there may be a spool-like member 70 slidable on the stud and provided with a squared projection 71 fitting between the spaced parts of the forked end of the lever and backed up by nut 72. The spool and nut may have cooperating serrated surfaces as at 73. The nuts may be tightened but the spool members are prevented from rotation by reason of the squared portions fitting in the bifurcated parts of the levers.

A clutch throw-out element 75 may be slidably mounted upon the shaft 3 and operable by the usual pedal 7 so that when the pedal is depressed the element 75, as Fig. 2 is viewed, rocks the levers 68 and retracts the pressure plate against the action of the packing springs.

As heretofore described, when the engine is accelerated the centrifugal elements shift outwardly and axially; the driven disk is packed between the centrifugal elements and the pressure plate 60, the pressure plate being backed up by the packing springs 65. This established clutch engagement. Upon deceleration the centrifugal segments shift radially inward to a position as illustrated in Fig. 2; it will be appreciated, however, that this will not suffice to disengage the clutch unless the pressure plate is prevented from following the segments as they back away toward the flywheel, since the pressure plate under the action of the springs 65 will tend to follow the segments. Accordingly, the invention provides means for establishing a definite stopping position for the pressure plate, which position is substantially illustrated in Fig. 2.

Figure 3:
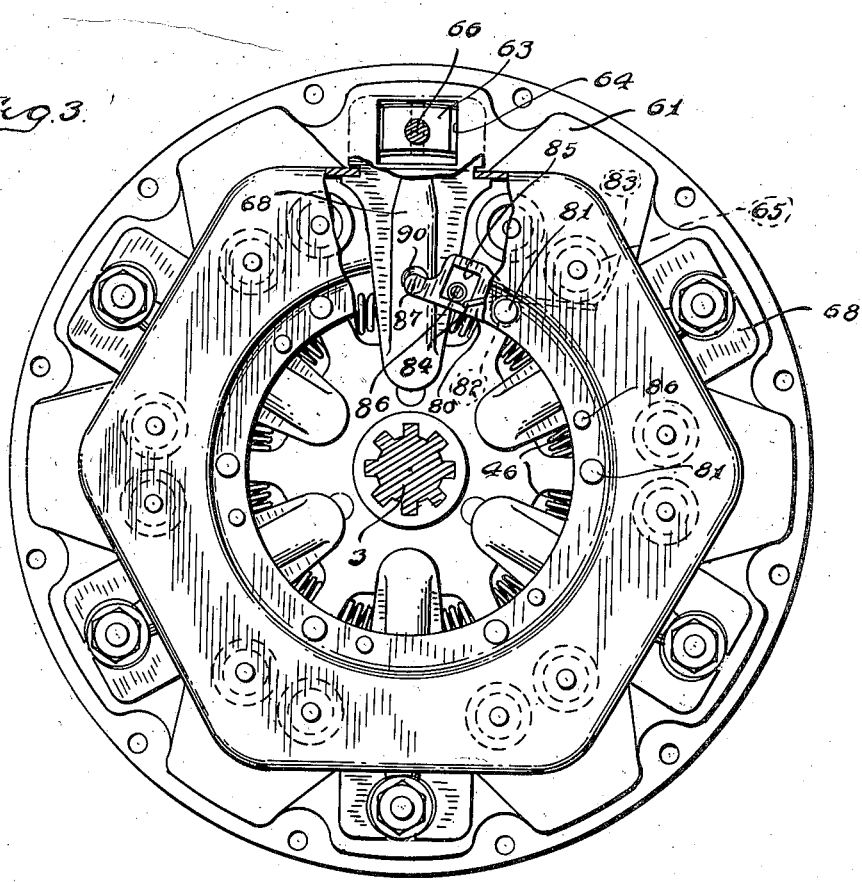
Fig. 3 is a rear end view of the clutch structure.

To this end, stop devices are provided. Such stop devices may be members automatically actuated by centrifugal action and one for each lever. As shown in Fig. 3, and in Fig. 6, the stop members comprise each a body 80 pivotally mounted upon stud 81 carried by the cover plate. A tortion spring 82 may surround the stud, one end of which, as at 83, may engage a retainer cup for one of the pressure springs, whereas the other end, as at 84, may be hooked into an aperture 85 in the stop member. Studs 86 are carried by the cover plate and project through the apertures in the stop members, and as the walls of the apertures strike the studs the pivotal movement of the studs is limited. Each stop may have a reduced end 87 against which suitable means on the levers abut to effect the stopping action. The tortion springs are arranged to normally hold the stops in the position shown in Fig. 7, but under centrifugal action the stops pivot against the action of the tortion springs and take a position as illustrated in Fig. 3 unless they are otherwise restrained from so doing.

On each clutch releasing lever there may be provided an abutment device in the form of a button 90 adapted to make contact with the portion 87 of a stop as shown in Fig. 2. Relatively light coil springs 91 may be employed one with each releasing lever serving as anti-rattle springs and holding the outer portions of the clutch releasing levers against the respective spools 70.

In a structure thus devised it will be noted that there are two different sets of elements centrifugally controlled, namely, the segmental clutch members, and the pivoted stop members for the clutch levers. The preferred arrangement is that the stop members are centrifugally thrown outwardly to the limit of their movement at an R. P. M. below the R. P. M. necessary to effect clutch engagement. For the purpose of describing the operation, let it be assumed for example that a clutch engagement starts at about 400 R. P. M. and that the stop members 80 are swung outwardly on their pivots centrifugally at about 100 R. P. M. Let it be assumed that the parts are in the position shown in Fig. 2 with the clutch disengaged and with the engine idling at an R. P. M. less than that necessary to effect clutch engagement; in the example given, the R. P. M. will be less than 400. Upon acceleration of the engine the centrifugal weights shift radially outwardly and axially and come into engagement with the friction facing on the driven disk to the end that the driven disk is packed between the centrifugal segments and the pressure plate. The packing springs 65 are preferably calculated to give the desired torque capacity, and as the R. P. M. increases the pressure plate will be backed away by the compression of the packing springs. Eventually, the segmental centrifugal members may contact with the portion 17 of the backing plate, and at this point the clutch has reached its maximum torque capacity. Now upon deceleration of the engine, the springs 22 cause the segments to shift radially inward and at the same time axially away from the pressure plate. The pressure plate follows the segments in this axial movement until such time as the buttons 90 engage the stops 80 to thus eliminate further axial movement of the pressure plate toward the flywheel, to the end that the segments separate axially from the pressure plate and release the driven disk. After the known manner, the speed change gears may be shifted during the period that the clutch is released. Assume now that the engine is caused to come to a complete stop; there is no more centrifugal action upon the stop members 80, but these members are prevented from shifting under action of the torsion springs by reason of the fact that the buttons 90 frictionally grip the portion 87 of the stop members. Accordingly, the parts remain in the position illustrated in Fig. 2 so that when the engine is again started the clutch may be automatically engaged by merely accelerating the same. This permits of shifting the gears in the transmission case 4 in any manner in which the operator may desire without physical operation other than shifting the lever 8.

It becomes desirable at times to have a clutch engagement when the engine is not running or has become stalled. If the operator desires to leave a vehicle thus equipped standing where it is desirable to have the clutch connected so that the engine compression may serve a braking tendency on the vehicle, the clutch may be engaged by the slight depression of the lever 7; this rocks the clutch lever 68 and the buttons 90 release the stops 80. The torsion springs now rock the stops to the position illustrated in Fig. 7 so that when the lever 7 is again released the packing springs are free to urge the pressure plate axially toward the driven disk to the end that the driven disk is packed between the centrifugal elements and pressure plate. There is no rotation of the parts during this action. Also, in the event it is necessary or desirable to start a vehicle engine by movement of the vehicle itself, as by towing it or pushing it, the clutch may be thus engaged so that movement of the vehicle through the clutch may start the engine.

The present clutch construction is particularly advantageous for use with a free wheeling unit such as illustrated at 5 in Fig. 1. This of course, as above pointed out, permits the engine to drop to idling speed while the vehicle may continue traveling along a roadway without substantial deceleration. There is a danger at this time that the engine will die, or in other words, come to a complete stop, particularly if the same is cold or overheated or for some other reason. Should this happen, the centrifugal clutch becomes disengaged and except for the present clutch construction the usual engine starter would have to be employed to effect restarting of the engine. However, at this time, the operator may merely depress the lever 7 slightly, enough to free the stops 80, so that they move to the position shown in Fig. 7 under the action of the torsion springs, and then the clutch may be re-engaged by the operator as the lever 7 is permitted to retract under control of the foot. The movement of the vehicle may now effect rotation and starting of the engine through the engaged clutch. As soon as the engine is started the centrifugal action again tends to throw the stops out to the position illustrated in Fig. 3, and the stops are permitted to move to such position by a second slight depression of the lever 7 which is sufficient to shift the buttons 90 out of the way of the stops; or by acceleration of the engine sufficiently to cause the pressure plate to move back compressing the packing springs in which action the levers 68 swing and the stops 90 are shifted out of blocking position as regards the stops. Inasmuch as both the pressure plate and the segmental centrifugal elements move axially, and inasmuch as such movement has a direct association with the friction material on the driven disk, it is desirable to have an arrangement wherein an adjustment may be easily made to compensate for wear in the friction facings. As the friction material 42 wears away and becomes thinner, the pressure plate must necessarily move further toward the segments in effecting clutch engagement under the manual control. This disturbs the clearance arrangement as between the buttons 90 and the cover plate, but an adjustment may be easily made by turning the nuts 72, at which time the interengaging serrated portions on the nuts and buttons move past each other with a clicking action.

It will be noted that the unit assembly comprising the centrifugal weights and associated parts is in the form of a unit entirely separate from the unit comprising the pressure plate, the cover plate and associated parts, so that these two assemblies may be separately mounted. Adjustments and the like may readily be made in the unit comprising the cover plate and pressure plate, and this structure does not vary in any great degree from standard clutch construction. The centrifugal weight unit may, if the occasion arises that it becomes defective, be replaced by an entirely new unit. Due to the fact that the segments are stabilized by a multiple point contact with the backing plate, the segments in their movement are entirely stabilized with rocking action in all directions eliminated to the end that a uniform face to face engagement with the driven disk is obtained.

Thus it will be seen that the invention provides an automatically acting clutch which, as shown herein, is one centrifugally controlled. The automatic action takes care of clutch engagement and clutch disengagement in all normal operations of the vehicle. Some clutching elements, however, are under control of the operator at any time when rotation of the parts cease thus robbing the centrifugal elements of their function. It is to be particularly noted that this manual control is effected not through a secondary clutch or other drive-establishing connection, but through the same clutching elements ordinarily controlled by centrifugal action. Other conditions or causes may arise where the manual control may be effected when the rotation of the driving parts cease; that is to say, other conditions than those set forth above. In this respect it may be pointed out that when an engine is started in cold weather it is often necessary to keep the engine idling at a relatively high rate of speed in order to keep it running at all. This speed may be in excess of the normal idling speed, such as the example given above, namely, 400 R. P. M. This would cause the clutch to become engaged, making it impossible to become released. However, the operator may prevent this by merely controlling the clutch in the conventional manner; that is to say, by depressing the lever to release the clutch and then allowing the lever to retract to engage the clutch. The preferred arrangement is that when the lever 7 is substantially fully depressed the pressure plate 60 has been sufficiently retracted so that the driven disk will not be packed between it and the centrifugal weights, the centrifugal weights having moved radially outward and stopped against the member 17.

I claim:

1. A clutch comprising in combination, a driving member, elements thereon movable by centrifugal action, means for effecting axial movement of said elements, another driving member, packing springs acting thereon normally urging the same toward the first mentioned driving member, said driving members being normally spaced apart, a driven member disposed between them, operator controlled means for shifting the second mentioned driving element toward and away from the first mentioned driving element, and stop means for limiting the movement of the second mentioned driving member toward the first under the action of said packing springs, said stop means comprising a stop member shiftable into stopping position incident to rotation of the parts.

2. A clutch comprising in combination, a driving member, elements thereon movable by centrifugal action, means for effecting axial movement of said elements, another driving member, packing springs acting thereon normally urging the same toward the first mentioned driving member, said driving members being normally spaced apart, a driven member disposed between them, operator controlled means for shifting the second mentioned driving element toward and away from the first mentioned driving element, and stop means for limiting the movement of the second mentioned driving member toward the first under the action of said packing springs, said stop means comprising a centrifugally controlled stop element shiftable by centrifugal action into stopping position.

3. A clutch comprising in combination, a driving member having centrifugally controlled clutching elements, means for effecting an axial movement of said elements incident to their radial movement caused by centrifugal force, a second driving member normally spaced from the first, a driven member disposed between the two driving members, packing springs acting upon the second driving member to urge the same toward the first driving member, centrifugally controlled stop means for limiting the movement of the second driving member toward the first driving member, and operator controlled means shiftable to release the stops from their effective position in the absence of centrifugal action thereon.

4. A clutch comprising in combination, a driving member including centrifugally controlled elements, means for effecting axial movement of said elements incident to centrifugal force, a second driving member normally spaced from the first, a driven member disposed between the two driving elements, packing springs normally urging the second driving member toward the first driving member, operator controlled means for retracting the second driving member against the action of the packing springs, centrifugally controlled stop means shiftable by centrifugal action into stopping position for limiting the movement of the second driving member under action of the packing springs, said stop means being releasable upon actuation of the operator controlled means whereby the same may shift to non-stopping position when not affected by centrifugal action.

5. A clutch comprising in combination, a driving member including centrifugally controlled clutching elements shiftable radially and axially, a second driving member, packing springs urging the second driving member toward the first, pivotally mounted centrifugally controlled stop means actuated into stopping position by centrifugal force and limiting the movement of the second driving member towards the first, a driven member disposed between the driving members and normally engaged and disengaged by the driving members in accordance with centrifugal action, operator control means for releasing the centrifugally controlled stop means, and spring means for shifting the said stop means out of stopping position upon said release.

6. A clutch comprising in combination, a driving member including centrifugally controlled clutching elements shiftable radially and axially, a second driving member, packing springs urging the second driving member toward the first, pivotally mounted centrifugally controlled stop means actuated into stopping position by centrifugal force and limiting the movement of the second driving member towards the first, a driven member disposed between the driving members and normally engaged and disengaged by the driving members in accordance with centrifugal action, operator control means for releasing the centrifugally controlled stop means, and spring means for shifting the said stop means out of stopping position upon said release, said spring means being operable to so shift said stops at an R. P. M. lower than the R. P. M. requisite for actuating the centrifugally controlled clutching elements into clutching engagement with the driven member.

7. A clutch comprising in combination a driving member having centrifugally controlled elements, means constraining said elements to move axially incident to centrifugal force, a second driving member, packing springs urging the second driving member toward the first, retracting levers connected to the second driving member, operator control means acting upon the levers to retract the second driving member against the action of the packing springs, centrifugally controlled stop means for blocking the levers and limiting the movement of the second driving member toward the first, a driven member disposed between the two driving members engageable and disengageable incident to the action of said centrifugally controlled elements, and spring means operable upon the centrifugally controlled stop means for shifting the same out of stopping position, the said spring means being operable substantially only when the operator control means is actuated to shift the levers and when the said clutch parts are at rest.

8. A clutch comprising in combination two normally axially spaced driving members, a driven disk disposed between the driving members, packing springs normally urging one driving member toward the other, means for impeding the movement of the said driving member toward the other under action of the springs, means subject to centrifugal force for impeding movement of the said driving member toward the other adapted to shift from impeding position in the absence of requisite centrifugal force acting thereon, said impeding means so positioning the driving member effected thereby that the driven member is free from the driving members, centrifugally controlled clutching elements carried by the other driving member shiftable by centrifugal action toward the spring pressed driving member to pack the driven member between the two driving members, and arranged to release the driven member from packed relation at a relatively low R. P. M., and operator controlled means effective upon the said impeding means for effecting shift thereof out of impeding position whereby the spring pressed driving member may be shifted beyond its impeded position to pack the driven member between the two driving members.

9. A clutch comprising in combination two normally axially spaced driving members, a driven disk disposed between the driving members, packing springs normally urging one driving member toward the other, means for impeding the movement of the said driving member toward the other under action of the springs, means subject to centrifugal force for impeding movement of the said driving member toward the other adapted to shift from impeding position in the absence of requisite centrifugal force acting thereon, said impeding means so positioning the driving member effected thereby that the driven member is free from the driving members, centrifugally controlled clutching elements carried by the other driving member shiftable by centrifugal action toward the spring pressed driving member to pack the driven member between the two driving members and arranged to release the driven member from packed relation at a relatively low R. P. M., and operator controlled means effective upon the said impeding means for effecting shift thereof out of impeding position when the same are substantially unaffected by centrifugal force whereby the spring pressed driving member may be shifted beyond its impeded position to pack the driven member between the two driving members.

10. As a new article of manufacture, an assembled drive member for a friction clutch and which is to be assembled with an engine driven member comprising a carrier plate, centrifugally controlled elements, means connecting the elements to the plate, means establishing a driving connection between the elements and plate, said last two means permitting the weights to shift radially outwardly and inwardly incident to centrifugal action, means associated with the plate and weights for imparting axial movement of the weights relative to the plate as they shift incident to centrifugal action, means carried by the plate for limiting the radially outward movement of the weights, said plate being adapted for connection to an engine driven member.

11. In a centrifugally controlled clutch, a carrier member, a weighted member carried thereby and shiftable relative to the carrier member incident to centrifugal action, a plurality of recesses in each member with the recesses arranged in matching pairs, said recesses having inclined walls, and a roller element pocketed in each matching pair of recesses and cooperating with the inclined walls to effect relative axial movement as the weighted member shifts incident to its centrifugal action.

12. In a centrifugally controlled clutch, a carrier member, a weighted member, a circular recess in each member at least one of which has walls of inverted cone shape, said recesses being substantially matched, and a ball pocketed in the matched recesses and adapted to cooperate with the inverted conical walls for effecting relative axial shift of carrier member and weighted member.

13. In a centrifugally controlled clutch, a carrier member, a weighted member carried thereby shiftable radially incident to centrifugal action, a circular recess in each member, and each having inverted conical shaped walls, said recesses being disposed in matched relation, and a ball pocketed in the matched recesses.

14. In a centrifugally controlled clutch, a carrier member having a plurality of spaced circular recesses with inverted conical walls, a weighted member carried by the carrier member having similar recesses with the recesses of the two members matched in pairs, means connecting the weighted member to the carrier member so that the weighted member may shift radially incident to centrifugal action, and a ball pocketed in each pair of matched recesses adapted to effect relative axial shift between the weighted member and carrier member as the weighted member shifts incident to centrifugal action.

15. Means for effecting relative axial shift between two members capable of relative radial shift, comprising matched recesses in the two members, at least one of which is circular in form with inverted conical shaped walls, and a ball pocketed in the matched recesses.

16. Means for effecting relative axial shift between two rotary members capable of relative radial movement, comprising matched recesses in the two members each circular in form with inverted conically shaped walls, and a ball pocketed in the matched recesses.

17. Means for effecting relative axial shift between two rotary members capable of relative radial movement, comprising matched recesses in the two members each circular in form with inverted conically shaped walls, a ball pocketed in the matched recesses, and means urging the two members normally toward each other whereby the ball substantially seats in the bottom of said recesses.

18. Means for effecting relative axial shift between two rotary members capable of relative radial movement, comprising matched recesses in the two members each circular in form with inverted conically shaped walls, a ball pocketed in the matched recesses, and spring means normally urging the two members toward each other whereby the ball normally substantially seats in the bottom of said recesses.

19. A clutch comprising in combination driving members, a driven member, packing springs tending to pack the driving members and driven member into frictional engagement, centrifugally controlled stop means for preventing packing engagement under action of the springs when the said stop means are in stopping position incident to centrifugal action, said stop means being shiftable out of stopping position when the clutch is not rotating, and centrifugally actuated devices for effecting packing engagement of the said driving and driven members.

20. A clutch comprising in combination a driving member, a second driving member, a driven disk disposed between the driving members, packing springs for packing the driving members toward each other with the driven disk interposed between them, clutch releasing levers for retracting a driving member to release the driven disk, centrifugally controlled stop means shiftable into stopping position by centrifugal action for blocking the movement of the levers to limit the action of the packing springs, centrifugally controlled means for effecting packing of the driven disk while the stop means are in stopping position, and for relieving the packing of the driven disk upon decrease of centrifugal action, and means effective in the absence of substantial centrifugal action for shifting the said stop means out of stopping position whereby to permit lever movement and clutch engagement independent of centrifugal action.

21. In a clutch, the combination of two axially spaced driving members, a driven disk disposed between the driving members, packing springs normally urging the driving members toward each other, centrifugally controlled stop means normally holding the driving members spaced apart with the driven member free, centrifugally controlled means on a driving member shiftable by centrifugal action to engage the driven disk between the driving members, and operator actuated means for releasing the centrifugally controlled stop means, said stop means being arranged to shift out of stopping position in the absence of substantial centrifugal action whereby to permit said packing springs to shift the driving members into packing relation with the driven disk in the absence of centrifugal action.

22. In a clutch the combination of driving and driven members arranged to be packed together in driving relation, springs tending normally to engage the members, levers operable for disengaging the members against the action of the springs and shiftable when the members engage by spring action, a separate impeding device for each lever for impeding lever movement to hold the members disengaged against the action of the springs, and said impeding devices being held in impeding position by pressure of the levers in the absence of centrifugal force, centrifugally controlled means for effecting engagement and disengagement of the clutch members in accordance with the centrifugal action while the levers remain impeded, and operator controlled means for acting upon the levers to release the pressure on the impeding devices whereby the devices may shift the inoperative position so that the clutch members may be engaged in the absence of centrifugal action.

23. In a clutch the combination of driving and driven members arranged to be packed together in driving relation, springs effective on one driving member tending normally to engage the driving and driven members, means for impeding movement of the said driving member upon which the springs are effective to maintain the driving and driven members disengaged against the action of the springs, centrifugally controlled means for effecting engagement and disengagement of the members in accordance with centrifugal action while said impeding means remains effective, and operator controlled means for rendering the impeding means ineffective whereby the clutch members may be engaged in the absence of centrifugal action, said impeding means comprising a centrifugally controlled element shiftable into impeding position by centrifugal action.

24. In a clutch, the combination of rotary driving and driven members including centrifugal weights on the driving member, said members being disposed axially side by side, the driven member being adapted to be frictionally engaged and disengaged by axial movement of a driving member relative to the driven member, said weights arranged to shift radially incident to centrifugal force, matching pockets in the weights and an adjacent member, said pockets having inclined surfaces, and a ball confined in each pair of matching pockets and acting upon the inclined surfaces to effect axial movement of the weights as they shift incident to centrifugal force.

25. In a clutch, the combination of rotary driving and driven members including centrifugal weights on the driving member, said members being disposed axially side by side, the driven member being adapted to be frictionally engaged and disengaged by axial movement of a driving member relative to the driven member, said weights arranged to shift radially incident to centrifugal force, matching pockets in the weights and an adjacent member, at least one of the pockets in each pair of matching pockets having an inclined surface, and a ball confined in each pair of matching pockets and acting upon such inclined surface to effect axial movement of the weights when the weights shift incident to centrifugal force.

26. In a centrifugally controlled clutch, a rotary driving member, a weight member shiftable radially incident to centrifugal action, substantially matching recesses in the driving member and weight, a roller element pocketed in the matching recesses, at least one of the recesses having a bottom wall inclined with respect to a radial plane and upon which the roller element functions to effect relative axial shift of the driving member and weight member as the weight moves radially incident to centrifugal action.

27. In a centrifugally controlled clutch, a rotary driving member, a weight member shiftable radially incident to centrifugal action, substantially matching recesses in the driving member and weight, a roller element pocketed in the matching recesses, said recesses having bottom walls inclined with respect to a radial plane, said roller element being in engagement with said walls and functioning thereon to effect relative axial movement between the driving member and weight as the weight shifts radially incident to centrifugal action.

28. Means for effecting relative axial shift between two rotary members capable of relative radial movement comprising matched recesses in the two members, each recess having a bottom wall inclined with respect to a radial plane, said walls substantially paralleling each other, and a ball pocketed in the matched recesses for moving along said inclined walls.

29. Means for effecting relative axial shift between two rotary members capable of relative radial movement comprising matched recesses in the two members, each recess having a bottom wall inclined with respect to a radial plane, and a ball pocketed in the matched recesses for moving along said inclined walls.

ERNEST E. WEMP.